United States Patent [19]
Ohms

[11] Patent Number: 5,359,885
[45] Date of Patent: Nov. 1, 1994

[54] METHOD OF MEASURING RUN-OUT OF A ROTARY MEMBER

[75] Inventor: Klaus-Peter Ohms, Darmstadt, Germany

[73] Assignee: Hofmann Maschinenbau GmbH, Pfungstadt, Germany

[21] Appl. No.: 41,264

[22] Filed: Apr. 1, 1993

[30] Foreign Application Priority Data

Jul. 30, 1992 [DE] Germany .................. 4225195

[51] Int. Cl.$^5$ ........................................... G01M 1/00
[52] U.S. Cl. ......................................... 73/146; 73/66
[58] Field of Search ..................... 73/118.1, 146, 66; 33/203, 642, 661

[56] References Cited

U.S. PATENT DOCUMENTS 5,263,261  11/1993  Piety et al. .................. 33/661 X

FOREIGN PATENT DOCUMENTS 1278140  9/1968  Germany .

OTHER PUBLICATIONS

L. Kramer, K.-P. Ohms, Einfluss Der Kraftfahrzeugrader Auf Das Fahrverhalten, Werkstatt und Betrieb 103 (1970), pp. 183–188.

Primary Examiner—Hezron E. Williams
Assistant Examiner—James M. Olsen
Attorney, Agent, or Firm—Cushman, Darby & Cushman

[57] ABSTRACT

A method of measuring radial and/or lateral run-out of a rotary member, where the rotary member is mounted in a testing machine by a play-compensating clamping arrangement, and rotated. While it rotates the rotary member is sensed in the region of its peripheral and/or lateral surfaces and the result of the sensing operation is used to produce run-out diagrams. First and second run-out diagrams which are turned relative to each other through 180° with respect to the clamping mounting arrangement are combined together, thereby to compensate in the combination diagram for the geometrical measurement errors resulting from the clamping mounting arrangement in the initial diagrams.

8 Claims, 7 Drawing Sheets

METHOD OF MEASURING RUN-OUT OF A ROTARY MEMBER

BACKGROUND OF THE INVENTION

There are various situations which involve measuring the parameters of a rotary member, which can be referred to as rotational truth and plane truth. Rotational truth means concentricity of a peripheral surface of the rotary member, with deviations from a condition of such concentricity being referred to herein as radial run-out. Plane truth means that a lateral surface of the rotary member runs in the same plane so that that surface does not perform a wobbling movement in a lateral direction or in the axial direction of the rotary member, and deviations from a condition of truth in that respect will be referred to herein as lateral run-out. A typical situation which involves measuring radial and/or lateral run-out of a rotary member is that of testing a motor vehicle wheel, with or without a tire thereon, and such a measuring method is to be found in the German publication Werkstatt und Betrieb 103 (1970), pages 183–188. In that method, the rotary member testing operation involves mounting the rotary member in the testing machine by means of a play-compensating clamping arrangement and rotating the rotary member. During the rotary movement the rotary member is sensed with contact-type or non-contact sensors. When the rotary member is a motor vehicle wheel, the sensors can scan the wheel flanges of the disk wheels and tire tread strip portions and side walls of the pneumatic tire on a wheel. The results of the sensing operation or operations are then used to produce by mechanical or electrical means diagrams which show the radial and/or lateral run-out of the rotary member at the sensed locations thereon.

With measurement systems of that kind, it is not possible to avoid the clamping center of the clamping mounting arrangement being displaced relative to the center of rotation or axis of rotation about which the rotary member rotates in the testing operation. Furthermore, when the rotary member is clamped in position on a measuring spindle the testing machine between a flange on the spindle and the clamping mounting arrangement clampingly co-operating therewith, surface contact flaws or defects in respect of the flange or the clamping mounting arrangement can give rise to departures from the proper position of the rotary member on the spindle, which affects the condition of lateral run-out truth.

As the levels of requirement in respect of measuring accuracy when ascertaining radial and/or lateral run-out in relation to a rotary member are often in the region of a few hundredths of a millimetre, deviations and misalignments from a condition of perfect geometry of less than one hundredth of a millimetre must be maintained at the contact surfaces for supporting the rotary member on the spindle and at the location at which the rotary member is centered thereon. It is difficult in a practical context to achieve that kind of accuracy.

In regard to the levels of requirement in regard to measuring accuracy, it is also to be borne in mind that the rotational truth error or eccentricity of the clamping mounting arrangement for the rotary member exerts its effect fully circumferentially on radial run-out measurement in respect of the rotary member or test item, for example at both wheel flanges of a motor vehicle disk wheel. That means that the measurement result suffers from errors in different ways both in regard to what is referred to as radial throw (peak-peak value) and also the first harmonics of radial run-out phenomena.

In addition the surface contact error in respect of the clamping mounting arrangement also causes falsification of the radial run-out measurement which has a different effect on the wheel flanges in the case of a disk wheel as they are arranged in relation to the mounting surface of the wheel in a position which is dependent on the depth of impression of the wheel, that is to say in dependence on the offset of the rim portion of the wheel relative to the wheel mounting center, and thus the wheel flanges are not generally symetrically relative to the wheel mounting surface. Because of the relationship between the mounting radius and the wheel flange radius which is always significantly greater than 1 and which is generally between about 3:1 and 5:1, the above-mentioned surface contact error can give rise to serious falsification in terms of lateral run-out measurement.

The mounting inaccuracies, in regard to radial or lateral run-out, always exert an overall influence which results from the combined action of the above-indicated phenomena, irrespective of whether the mounting error is pure eccentricity or a punctiform error or flaw. The influence on measurement in respect of the rotary member always takes its effect in the form of additive falsification in the radial or lateral run-out diagram produced. The configuration of radial and/or lateral run-out at the measuring locations, which is dependent on time and/or angle of rotation, is made up of error-affected first harmonics and non-error-affected upper harmonics and thus also determines the peak-peak value.

SUMMARY OF THE INVENTION

An object of the present invention is to provide a method of measuring run-out of a rotary member such as a motor vehicle wheel which does not suffer from the disadvantages of the above-discussed procedures.

Another object of the present invention is to provide a method of measuring run-out of a rotary member which eliminates falsifications in the measurement result resulting from errors in the geometry of the clamping mounting arrangement.

Still another object of the present invention is to provide a method of measuring run-out of a vehicle wheel unit which gives enhanced accuracy of measurement while involving a simple operating procedure.

In accordance with the present invention the foregoing and other objects are achieved by a method of measuring radial and/or lateral run-out of a rotary member such as a motor vehicle wheel, in which the rotary member is carried in a testing machine by means of a play-compensating clamping mounting arrangement and rotated. During its rotary movement the rotary member is sensed by sensing means in the region of its peripheral and/or lateral surfaces, to produce from the results of the sensing operation first and second run-out diagrams which are turned relative to each other in relation to the clamping mounting arrangement. The run-out diagrams are arithmetically combined together, the geometrical measurement errors in the diagrams, which result from the clamping mounting arrangement, being compensated in the diagram produced by the combination operation. The sensing means may be contact-type or contact-less sensing means.

In a preferred feature of the invention first and second measurement runs are effected in relation to the rotary member to be measured, thereby to produce said first and second diagrams, the rotary member being turned relative to the clamping mounting arrangement between the first and second measurement runs.

Preferably the rotary member is turned through 180° between the first and second measurement runs.

The method is preferably used for testing a tire of a motor vehicle wheel, and for testing a disk wheel.

PREFERRED EMBODIMENT

Figure 2:
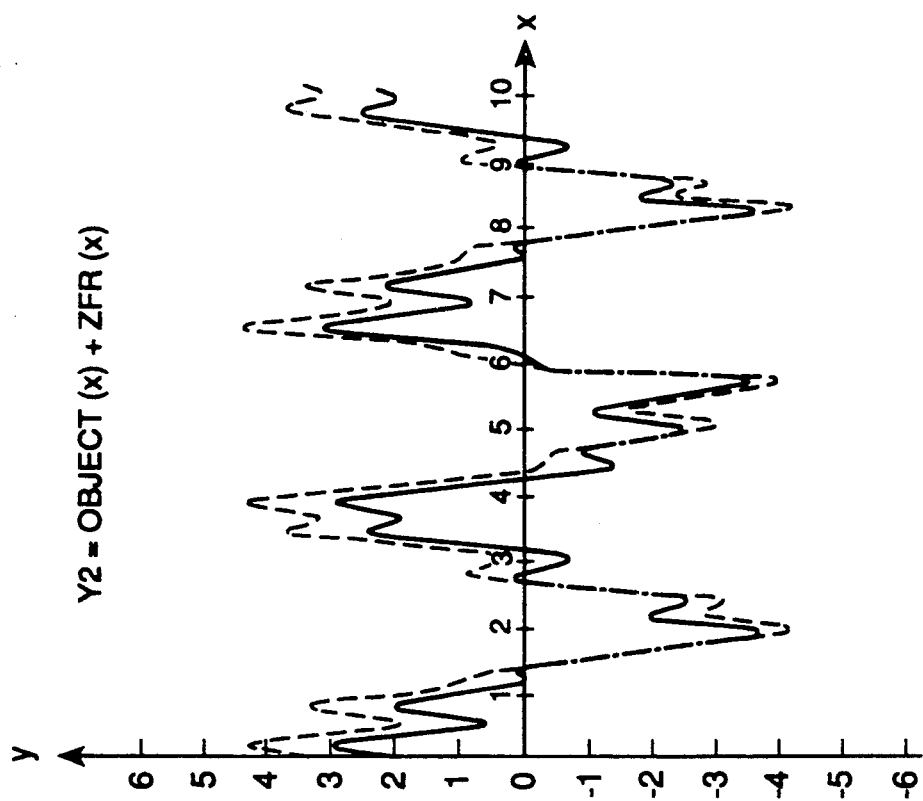
FIG. 2 is the real radial run-out of the rotor (after it has been turned through 180°) with radial geometrical errors of the mounting arrangement present.
Figure 1:
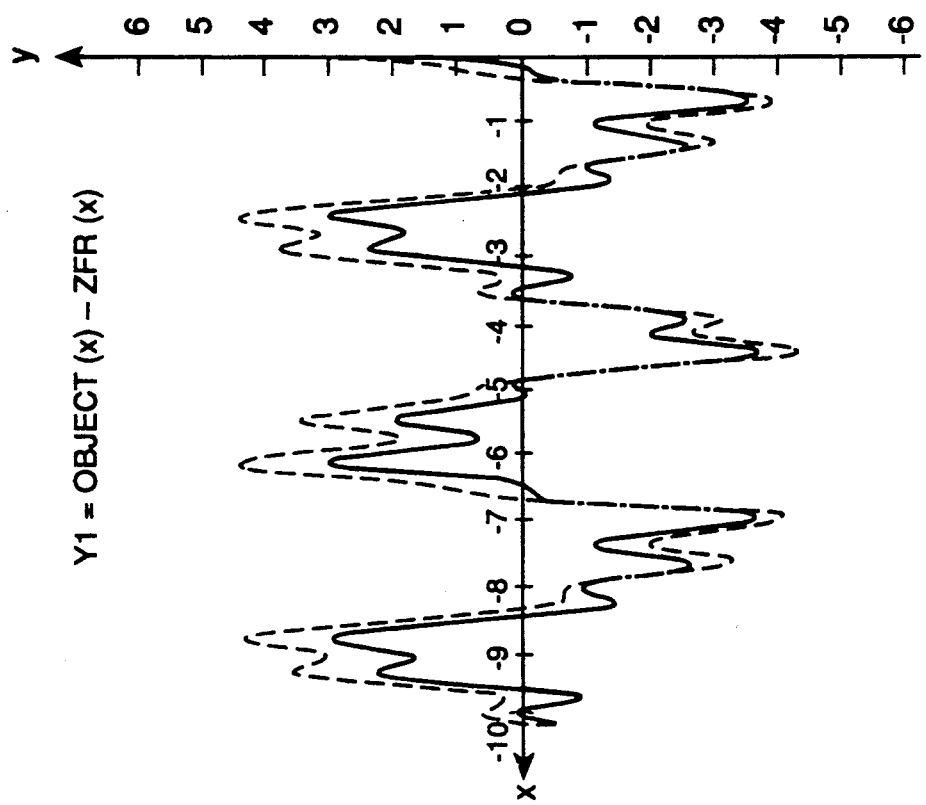
FIG. 1 is the real radial run-out of the rotor with radial geometrical errors of the mounting arrangement present.
Figure 4:
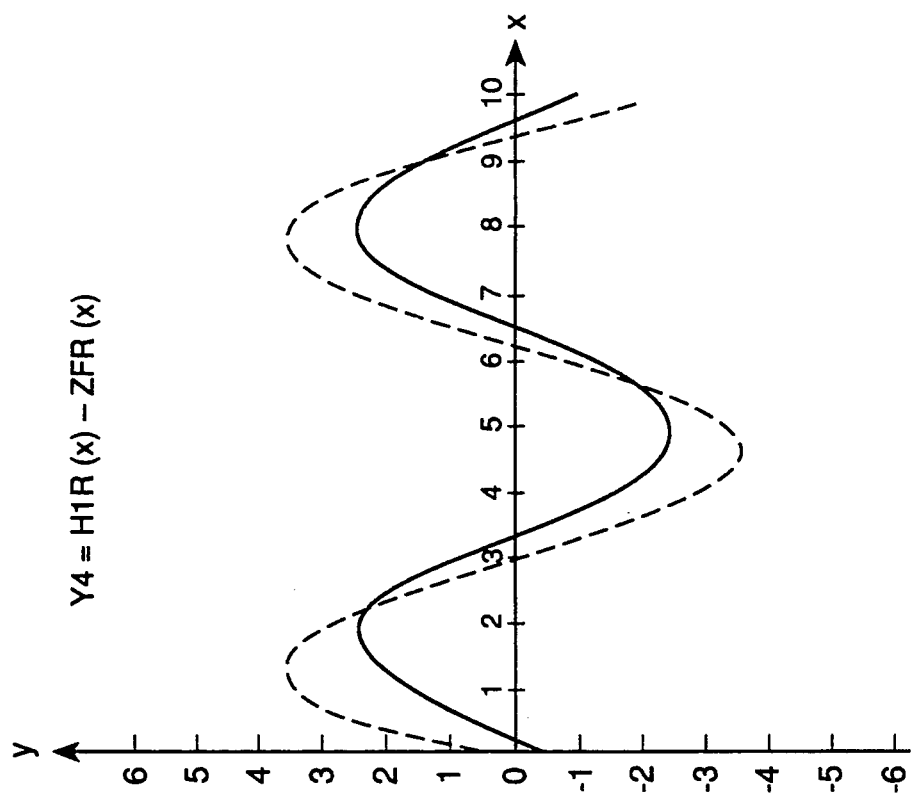
FIG. 4 is the first harmonic of FIG. 2.
Figure 3:
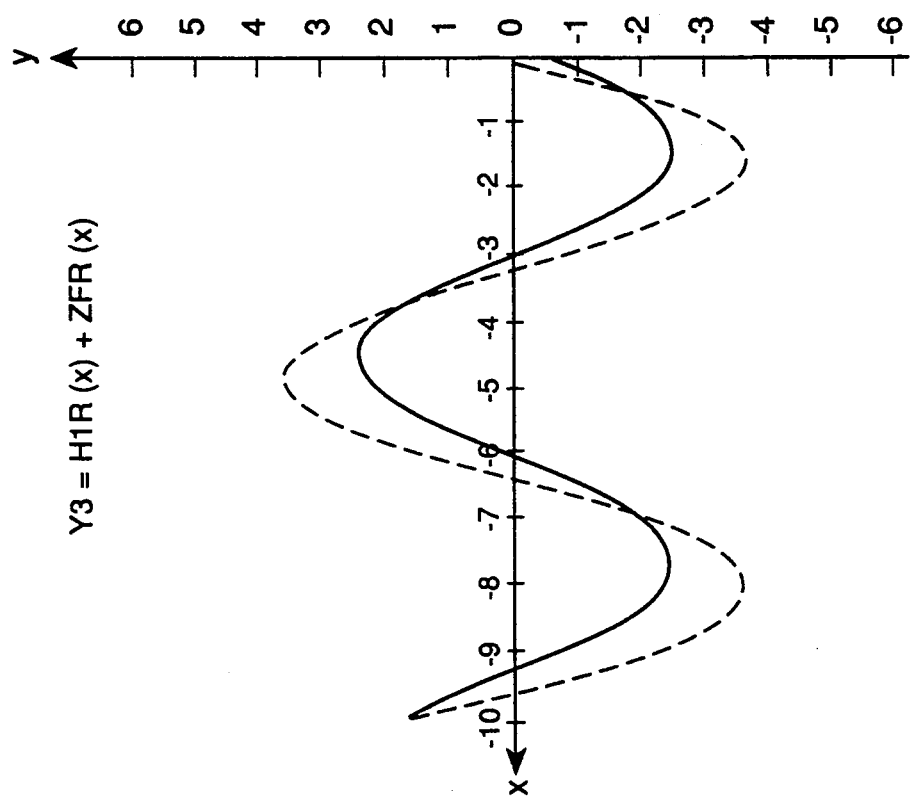
FIG. 3 is the first harmonic of FIG. 1.
Figure 5:
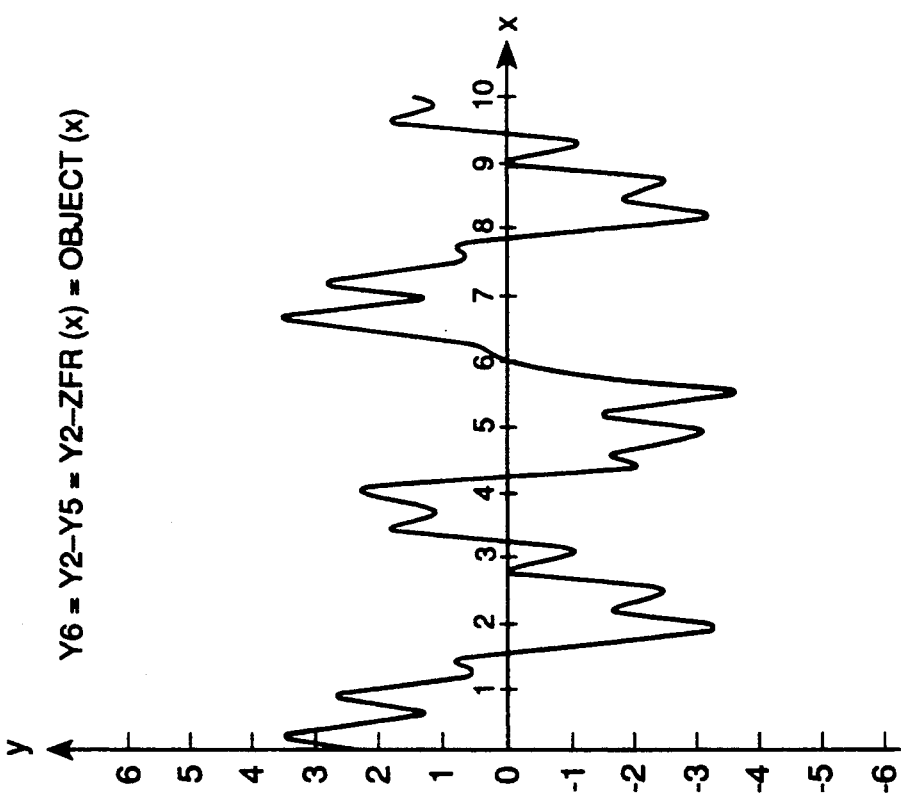
FIG. 5 shows the radial geometrical errors (first harmonic) of the mounting arrangement.
Figure 6:
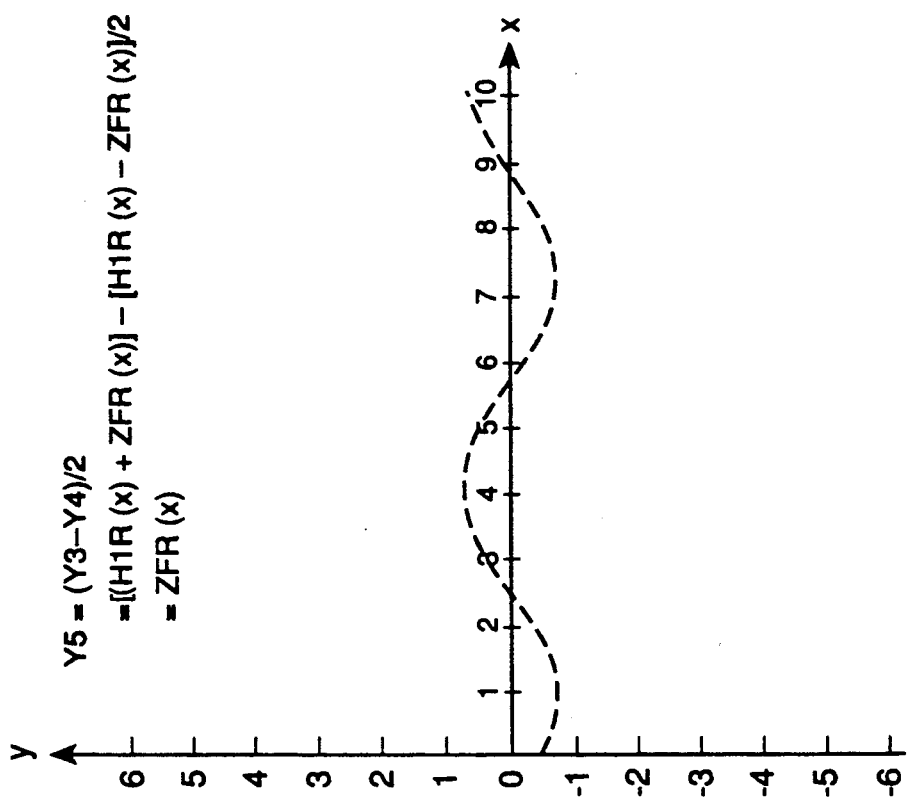
FIG. 6 shows the real radial run-out which is free from the radial geometrical errors of the mounting arrangement.
Figure 8:
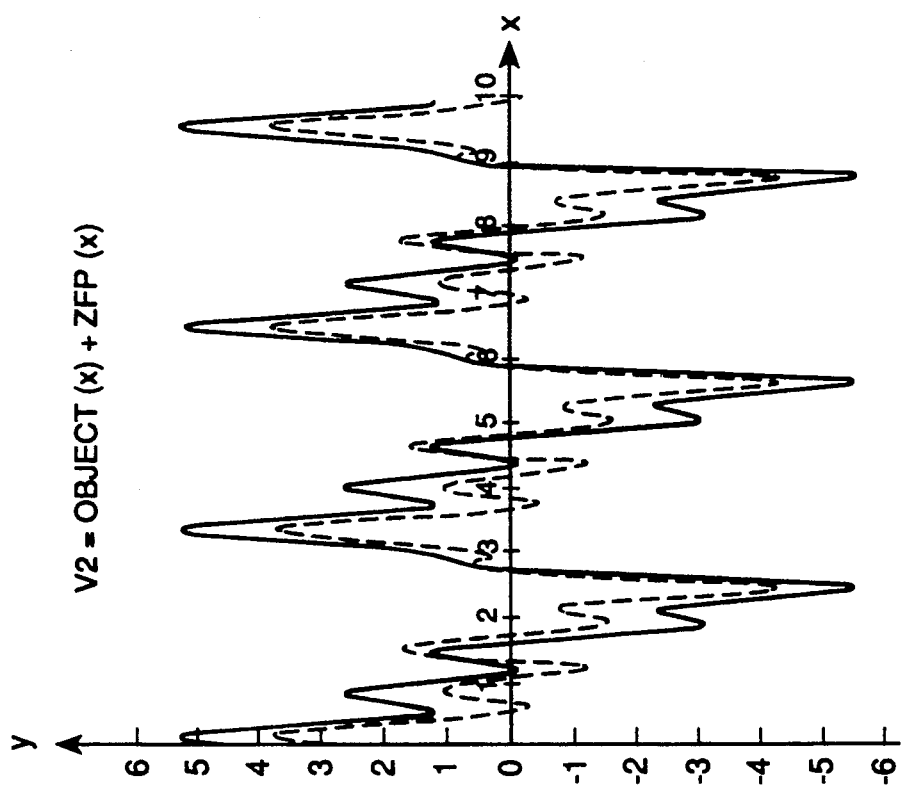
FIG. 8 is the real lateral run-out of the rotor (after it has been turned through 180°) with lateral geometrical errors of the mounting arrangement present.
Figure 7:
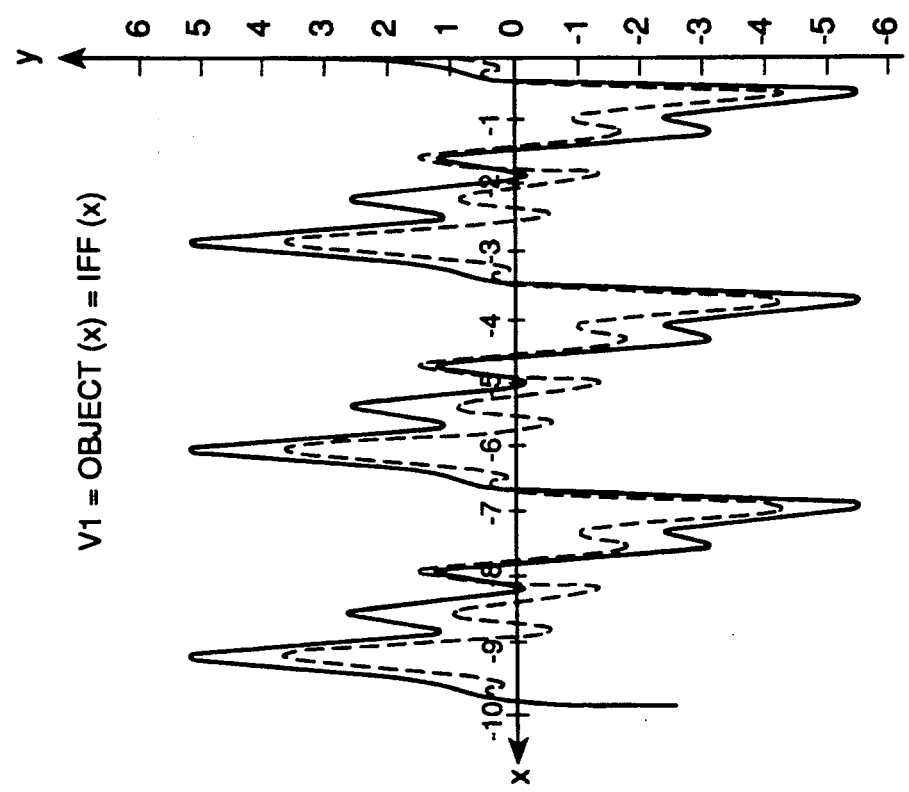
FIG. 7 is the real lateral run-out of the rotor with lateral geometrical errors of the mounting arrangement present.
Figure 10:
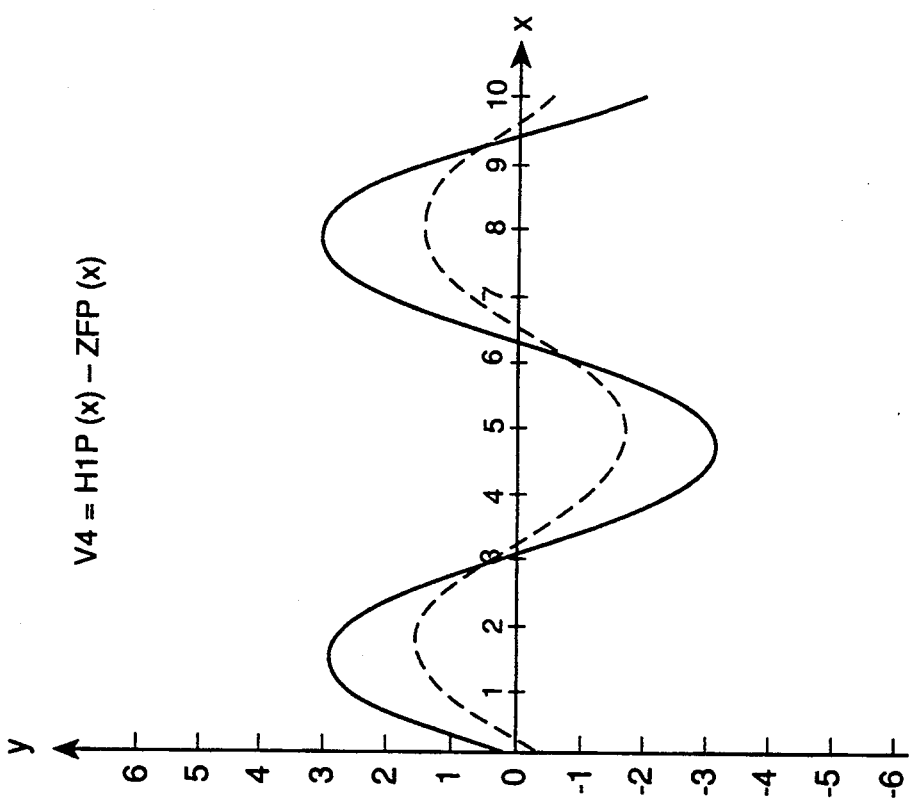
FIG. 10 is the first harmonic of FIG. 8.
Figure 9:
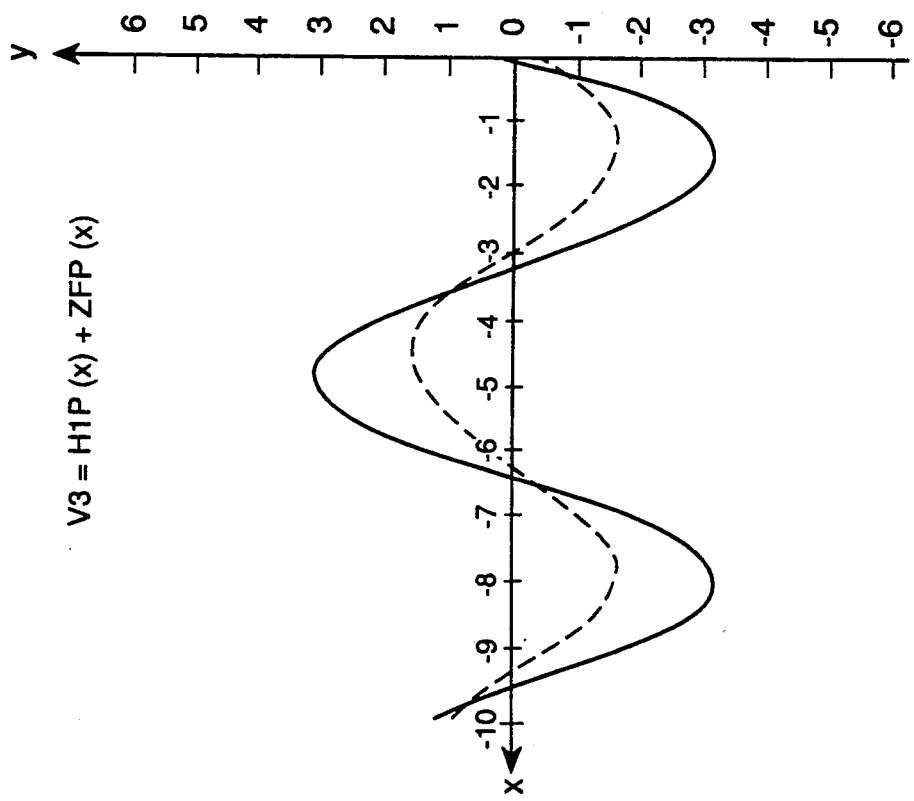
FIG. 9 is the first harmonic of FIG. 7.
Figure 11:
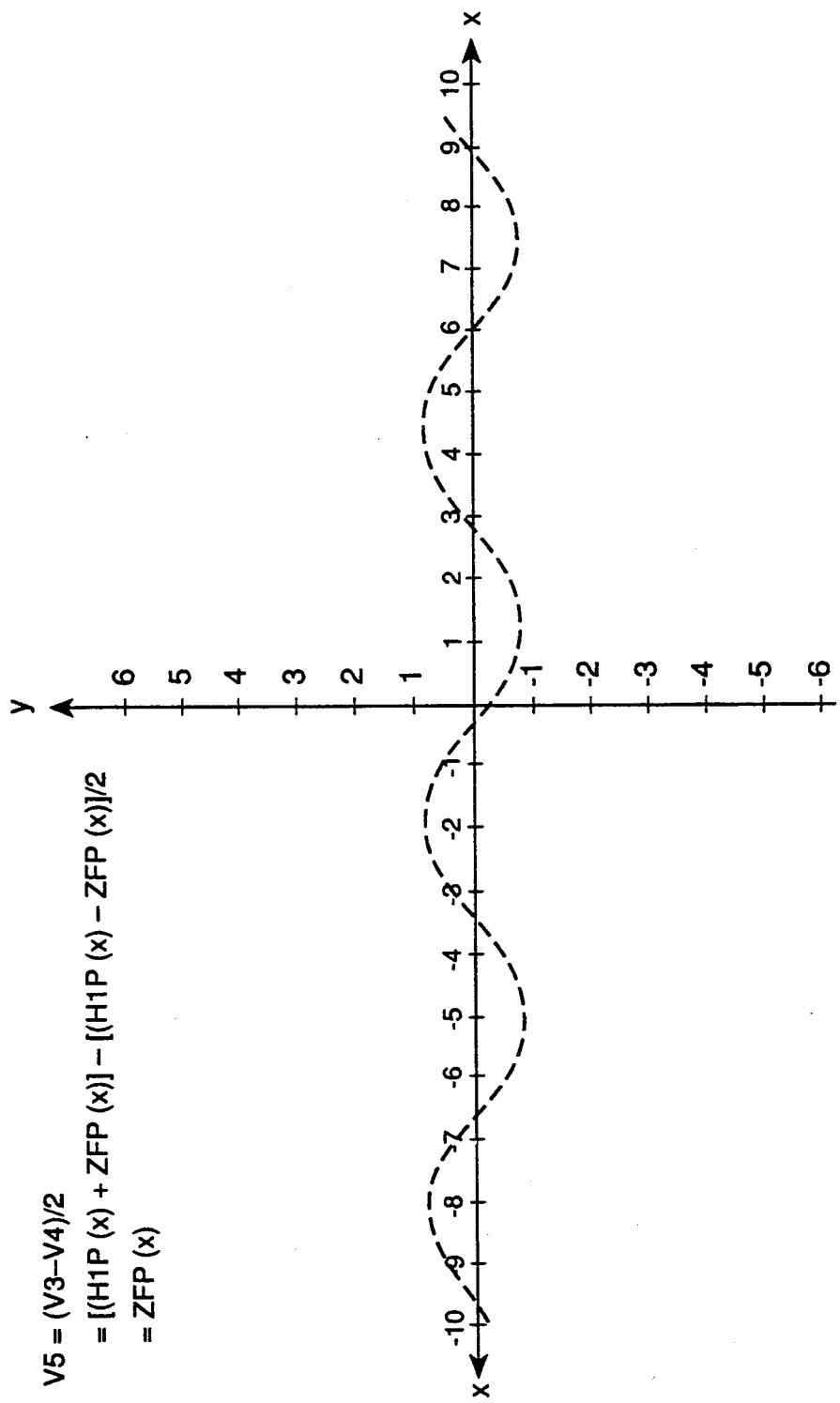
FIG. 11 shows the lateral geometrical errors (first harmonic) of the mounting arrangement.
Figure 12:
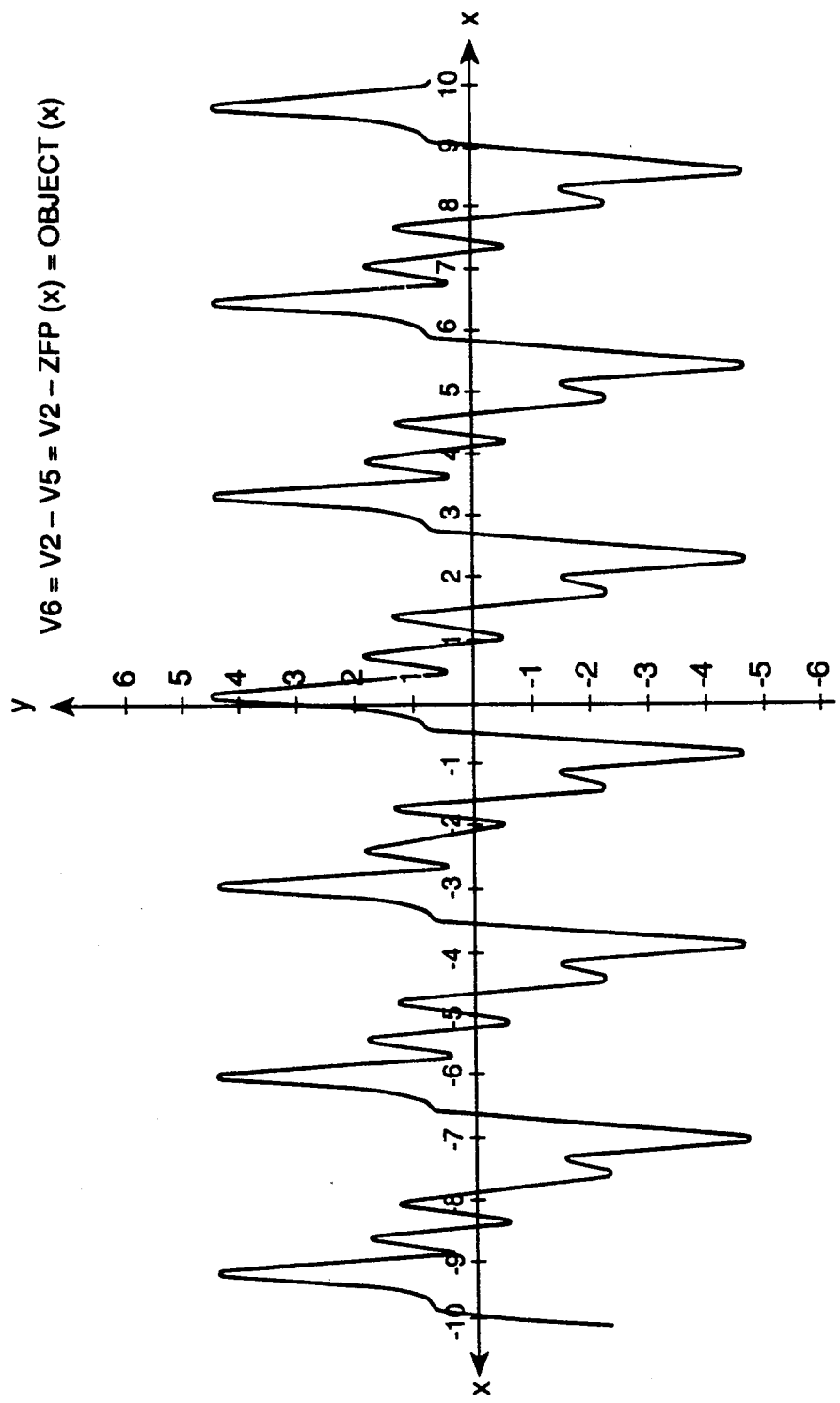
FIG. 12 shows the real lateral run-out which is free from the lateral geometrical errors of the mounting arrangement.

The method of measuring radial and/or lateral run-out of a rotary member such as a motor vehicle wheel and/or pneumatic tire comprises mounting the rotary member on a spindle of a testing machine by means of a play-compensating clamping mounting arrangement. The rotary member is rotated and during the rotary movement the member is sensed by sensors in the region of at least one of its peripheral and lateral surfaces. The sensing results are used to produce first and second run-out diagrams in first and second measurement runs, the rotary member being turned relative to the clamping mounting arrangement between the first and second measurement runs, preferably through 180°. The first and second run-out diagrams are arithmetically combined together, with the geometrical measurement errors in the first and second diagrams, which are caused by the clamping mounting arrangement, being compensated in the combination diagram.

By virtue of the fact that first and second radial run-out diagrams or lateral run-out diagrams, which are turned relative to each other with respect to the clamping arrangement, are combined together, this procedure provides that the combined diagram obtained eliminates measurement errors resulting from errors in terms of geometry of the clamping mounting arrangement. As indicated the preferred rotational angle is 180°. When the diagrams are combined, the error magnitudes which result from the geometrical errors of the clamping mounting arrangement and which are each contained in respective ones of the two diagrams compensate for each other.

When carrying out the method according to the present invention the two diagrams which are to be combined together may firstly be put into intermediate storage and then combined to produce the combination diagram which is free from the influence of error.

It may be noted in this respect that German patent specification No 12 78 140 discloses a procedure for measuring unbalances in a rotary member, in which first and second measurement runs are carried out to determine the respective overall unbalance measurement values, with the rotary member being turned through 180° between the two measurement runs. Forming half the vectorial sum of the unbalances detected provides a measurement parameter equivalent, which can be put into store, for the measurement parameter component which causes disturbances and which in subsequent measurement runs has an influence on the freshly produced measurement values.

In contrast thereto, the present method for the measurement of radial and/or lateral run-out involves procedures which are dependent on time and/or angle and which are recorded in the form of diagrams. The method of the present invention thus eliminates the influences of errors which result from the clamping mounting arrangement while it can also eliminate the influences of errors in relation to the above-mentioned peak-peak values.

It will be appreciated that the method of measuring run-out of a rotary member in accordance with the present invention has been described solely by way of example and illustration of the principles of the invention and that various other modifications and alterations may be made therein without thereby departing from the spirit and scope of the invention.

What is claimed is:

1. A method of measuring run-out of a rotary member, comprising the steps of mounting a rotary member in a play-compensating clamping mounting arrangement in a testing machine, rotating the rotary member, sensing movement of the rotary member in the region of at least one of its peripheral and lateral surfaces and generating data, generating first and second run-out diagrams from the data generated as a result of the sensing step, turning the first and second run-out diagrams relative to each other in relation to the clamping mounting arrangement, arithmetically combining the run-out diagrams together so that geometrical measurement errors in the first and second diagrams resulting from the clamping mounting arrangement are compensated in the diagram produced by the combining operation.

2. A method as set forth in claim 1 wherein the sensing means step employs contact-type sensing means.

3. A method as set forth in claim 1 wherein the sensing step employs contact-less sensing means.

4. A method as set forth in claim 1 including the additional step of conducting first and second measuring runs and turning the rotary member relative to the clamping mounting arrangement between the first and second measurement runs.

5. A method as set forth in claim 4 wherein the step of turning the rotary member includes turning the rotary member through 180° between the first and second measurement runs.

6. A method as set forth in claim 1 wherein the rotary member is a tire of a motor vehicle wheel.

7. A method as set forth in claim 1 wherein the rotary member is a wheel for a motor vehicle wheel.

8. A method of measuring at least one of the parameters constituted by radial run-out and lateral run-out of a rotary member, comprising rotating the rotary member which is carried in a testing machine by means of a play-compensating mounting arrangement, sensing the rotary member in the region of at least one of its peripheral and lateral faces, producing a first diagram in respect of at least one of said parameters from the result of said sensing operation, producing a second said diagram from the result of said sensing operation, the first and second said diagrams being turned relative to each other with respect to the clamping mounting arrangement, and arithmetically combining together said first and second diagrams thereby to compensate for the geometrical measurement errors caused by the clamping mounting arrangement in the first and second diagrams in the diagram obtained by said combination operation.

\* \* \* \* \*